United States Patent
Katayama

(10) Patent No.: US 6,434,092 B1
(45) Date of Patent: Aug. 13, 2002

(54) OPTICAL HEAD FOR LAND AND GROOVE RECORDING

(75) Inventor: Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/466,537

(22) Filed: Dec. 17, 1999

(30) Foreign Application Priority Data

Dec. 24, 1998 (JP) .......................... 10-368068

(51) Int. Cl.[7] .................................................. G11B 7/00
(52) U.S. Cl. .................................................. 369/44.23
(58) Field of Search .......................... 369/44.23, 44.37, 369/44.41, 103, 112.1, 112.12, 112.15

(56) References Cited

U.S. PATENT DOCUMENTS

| | | | | |
|---|---|---|---|---|
| 4,970,710 A | * | 11/1990 | Lee ......................... | 369/44.23 |
| 5,315,574 A | * | 5/1994 | Saimi et al. ............. | 369/44.41 |
| 5,844,870 A | * | 12/1998 | Braat ...................... | 369/44.41 |
| 6,104,689 A | * | 8/2000 | Noguchi ................. | 369/44.23 |
| 6,256,285 B1 | * | 7/2001 | Coombs ................ | 369/112.12 |

FOREIGN PATENT DOCUMENTS

| JP | 57-50330 | 3/1982 |
|---|---|---|
| JP | 63-66734 | 3/1988 |
| JP | 1-125731 | 5/1989 |
| JP | 3-100927 | 4/1991 |
| JP | 4-318332 | 11/1992 |
| JP | 5-174395 | 7/1993 |
| JP | 6-84223 | 3/1994 |
| JP | 08124184 A | * 5/1996 |
| JP | 09-073656 | 3/1997 |
| JP | 10-83541 | 3/1998 |
| JP | 10-134396 | 5/1998 |

OTHER PUBLICATIONS

Bernacki et al, "Characterization of a novel focusing/tracking technique with increased feedthrough immunity for optical–disk applications: the double–astigmatic method" Applied Optics vol. 32, No. 29, Oct. 10, 1993.

* cited by examiner

Primary Examiner—Thang V. Tran
(74) Attorney, Agent, or Firm—Hayes Soloway P.C.

(57) ABSTRACT

To remove sensitivity difference in focusing error signal between land and groove in order to optimize focusing servo gains simultaneously for land and groove. The laser beam reflected by an optical disk is diffracted by a holographic element, and the ±1st order diffracted beams are detected by a photo-detector which comprises a detecting portion for detecting the +1st order diffracted beam and another detecting portion for detecting the −1st order diffracted beam. Focusing error is generated on the basis of the difference between a focusing error signal obtained from the +1st order diffracted beam spot and another focusing error signal obtained from the −1st order diffracted beam spot.

3 Claims, 12 Drawing Sheets

F I G. 1
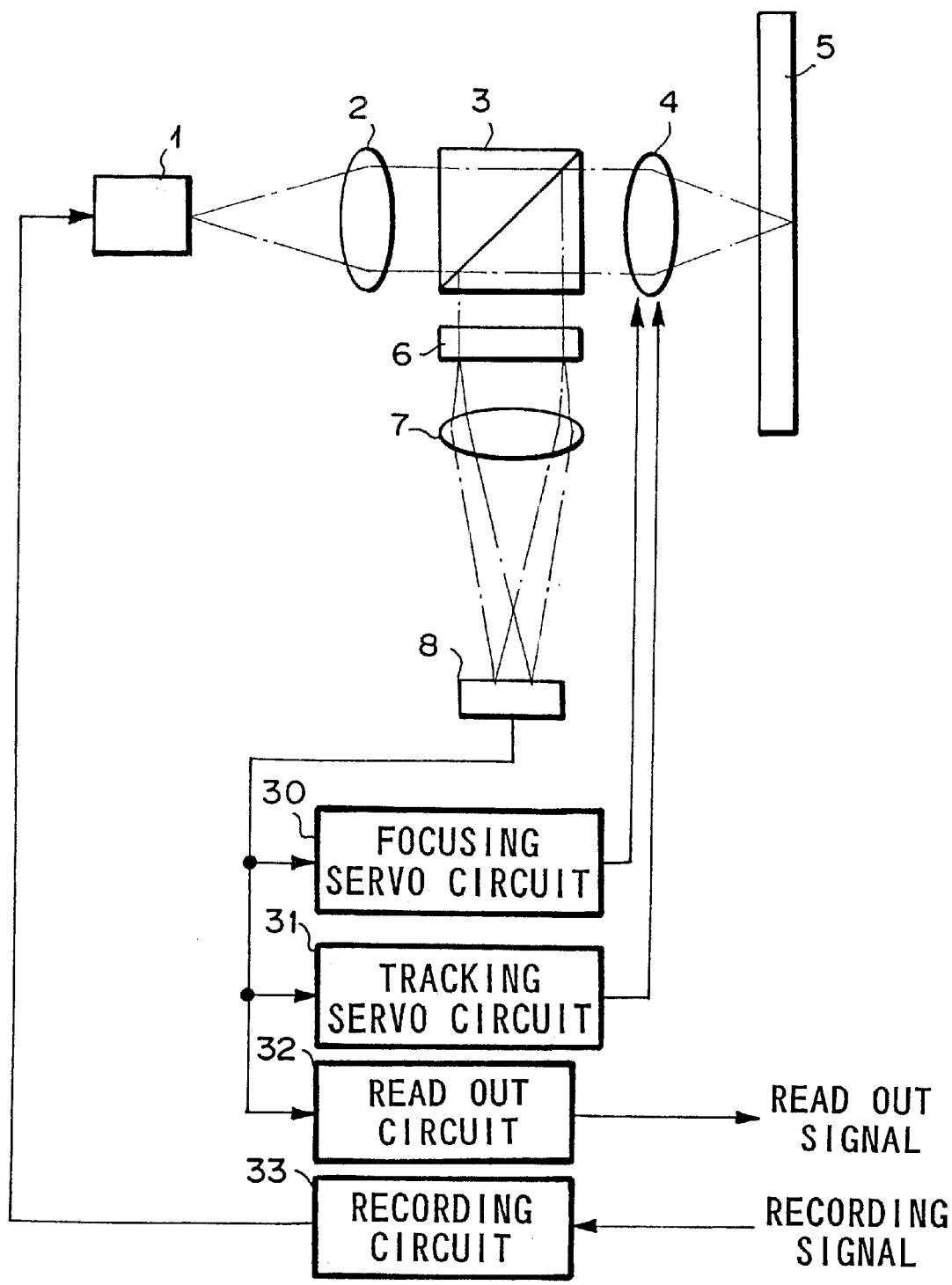

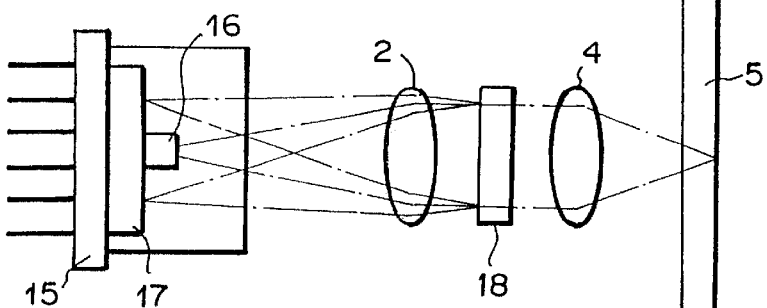
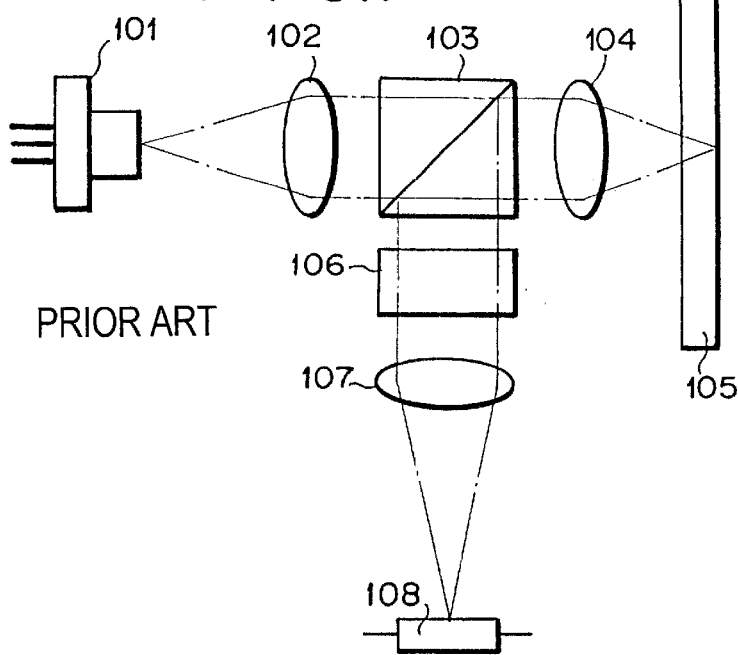
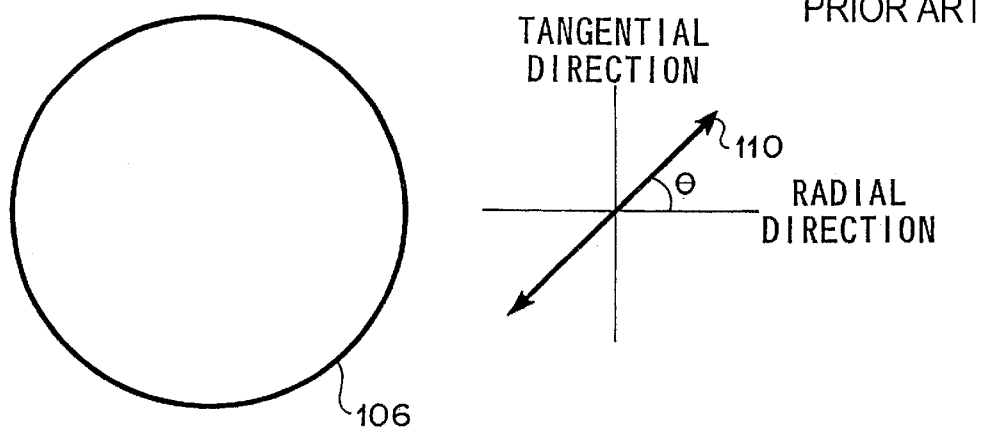

PRIOR ART
F I G. 15A
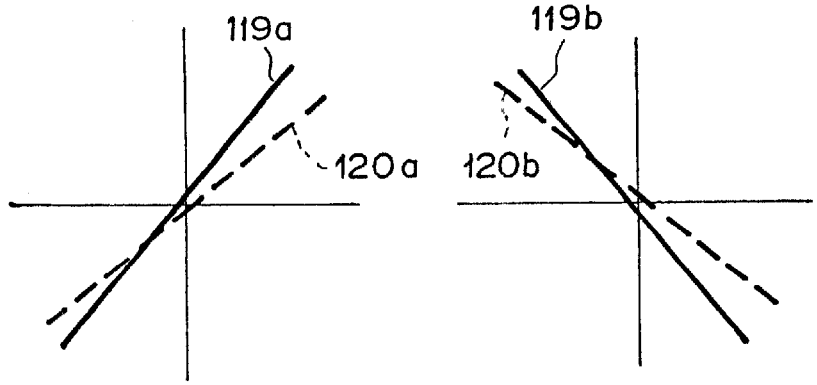
PRIOR ART
F I G. 15B
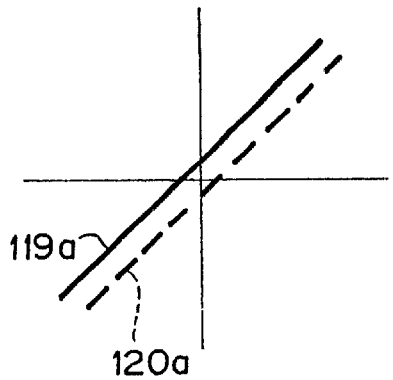
PRIOR ART
F I G. 15C
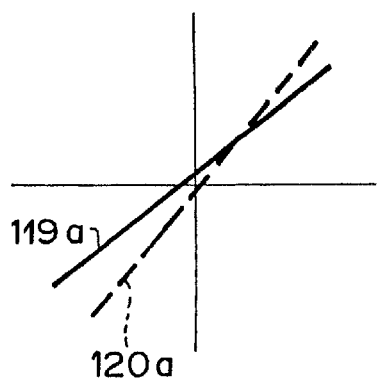
PRIOR ART
F I G. 15D
PRIOR ART
F I G. 15E
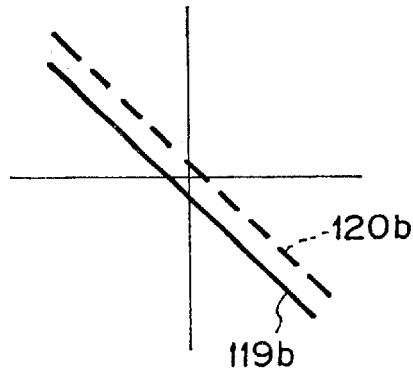
PRIOR ART
F I G. 15F
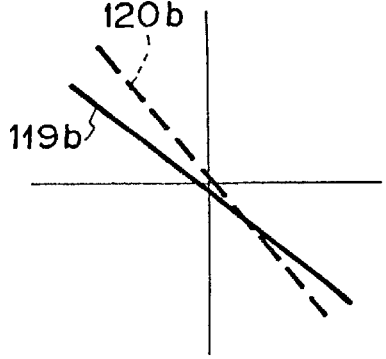

OPTICAL HEAD FOR LAND AND GROOVE RECORDING

BACKGROUND OF THE INVENTION

1. Technical Field of the Invention

The present invention relates to an optical head for detecting a focusing error signal in optical information read and write apparatuses, wherein both land and groove of recording medium are employed for reading and writing by optical beam from the optical head.

2. Description of the Prior Art

The astigmatic aberration method is often employed conventionally in order to obtain the focusing error signal, because it is easily combined with the push pull method for obtaining the tracking error signal.

A conventional optical head according to the astigmatic aberration method is shown in FIG. 7. The light from semiconductor laser 101 is collimated by collimator lens 102. Then, about 50% of the light passes through beam splitter 103. Further, the light is focused on optical disk 105 by objective lens 104. The light reflected by optical disk 105 passes through objective lens 104. Then, about 50% of the reflected light is reflected by beam splitter 103, and is detected by photo-detector 108 through cylindrical lens 106 and convex lens 107.

A plan view of cylindrical lens 106 is shown in FIG. 8. As shown in FIG. 8, the angle between the axis 110 of cylindrical lens 106 and the radial direction of optical disk 105 is θ. Here, θ is 45°.

Photo-detector 108 and beam spot thereon are shown in FIGS. 9A, 9B, and 9C, wherein the focused positions of the beam are different from each other. Photo-detector 108 comprises four light detecting portions 111 to 114 on which the light passing through cylindrical lens 106 is detected. The left to right direction in FIG. 8 is the radial direction of optical disk 105 and the down to up direction in FIG. 8 is the tangential direction of optical disk 105, while the left to right direction in FIG. 9 is the tangential direction of optical disk 105 and the down to up direction in FIG. 9 is the radial direction of optical disk 105, due to cylindrical lens 106.

In FIG. 9A, the major axis of elliptic beam spot 115 is directed from the lower left to the upper right, because optical disk 105 is positioned nearer to objective lens 4 than the focusing point. In FIG. 9B, the beam spot is circular, because optical disk 105 is positioned just on the focusing point. In FIG. 9C, the major axis of beam spot 115 is directed from the upper left to the lower right, because optical disk 105 is positioned farther from objective lens 4 than the focusing point.

The focusing error signal FE equals to ((V111+V114)−(V112+V113)), when the outputs from light detecting portions 111 to 114 are V111 to V114, respectively. FE becomes negative, zero, and positive, in FIGS. 9A, 9B, and 9C, respectively.

Further, the tracking error signal TE for the push pull method equals to ((V111+V112)−(V113+V114)). Furthermore, the read out signal RF equals to (V111+V112+V113+V114).

Another conventional optical head which detects focus error signal, according to the astigmatic aberration method is shown in FIG. 10. This optical head is disclosed in Applied Optics/Vol.32, No.29/Oct. 10 ,1993, pp 5789 to 5796. Light beam from semiconductor laser 101 is collimated by collimator lens 102. Then, about 50% of the light passes through beam splitter 103. Further, the light is focused on optical disk 105 by objective lens 104. The light beam reflected by optical disk 105 passes through objective lens 104. Then, about 50% of the reflected light is reflected by beam splitter 103. Then, the beam reflected by beam splitter 103 is divided into 50% transmission beam and 50% reflection beam by beam splitter 109. The 50% transmission beam is detected by photo-detector 108a through cylindrical lens 106a and convex lens 107a, while the 50% reflection beam is detected by photo-detector 108b through cylindrical lens 106b and convex lens 107b.

A plan view of cylindrical lens 106a is shown in FIG. 11A, while a plan view of cylindrical lens 106b is shown in FIG. 11B. The angle between the axes 110a and 10b of cylindrical lenses 106a and 106b and the radial direction of optical disk 105 is θ. Here, θ is 45°.

Photo-detector 108a and beam spot thereon are shown in FIGS. 12A, 12B, and 12C, while photo-detector 108b and beam spot thereon are shown in FIGS. 12D, 12E, and 12F. Photo-detector 108a comprises four light detecting portions 111a to 114a on which the 50% transmission beam from beam splitter 109 becomes beam spot 115a, while photo-detector 108b comprises four light detecting portions 111b to 114b on which the 50% reflection beam from beam splitter 109 becomes beam spot 115b.

The left to right direction in FIGS. 11A and 11B is the radial direction of optical disk 105 and the down to up direction in FIGS. 11A and 11B is the tangential direction of optical disk 105, while the left to right direction in FIGS. 12A to 12F is the tangential direction and the down to up direction is the radial direction, due to cylindrical lenses 106a and 106b. Beam spot 115a and beam spot 115b are mirror symmetrical in respect to the down to up direction.

In FIG. 12A, the major axis of elliptic beam spot 115a is directed from the lower left to the upper right, because optical disk 105 is positioned nearer to objective lens 104 than the focusing point. In FIG. 12B, the beam spot 115a is circular, because optical disk 105 is positioned just on the focusing point. In FIG. 12C, the major axis of elliptic beam spot 115a is directed from the upper left to the lower right, because optical disk 105 is positioned farther from the objective lens 104 than the focusing point.

In FIG. 12D, the major axis of elliptic beam spot 115b is directed from the upper left to the lower right, because optical disk 105 is positioned nearer to objective lens 104 than the focusing point. In FIG. 12E, the beam spot 115b is circular, because optical disk 105 is positioned just on the focusing point. In FIG. 12F, the major axis of elliptic beam spot 115b is directed from the lower left to the upper right, because optical disk 105 is positioned farther from the objective lens 104 than the focusing point.

The focusing error signal FEa detected by photo-detector 108a equals to ((V111a+V114a)−(V112a+V113a)), when the outputs from light detecting portions 111a to 114a are V111a to V114a, respectively. Similarly, the focusing error signal FEb detected by photo-detector 108b equals to ((V111b+V114b)−(V112b+V113b)), when the outputs from light detecting portions 111b to 114b are V111b to V114b, respectively. Here, FEa becomes negative, zero, and positive, in FIGS. 12A, 12B, and 12C, respectively, while FEb becomes positive, zero, and negative, in FIGS. 12D, 12E, and 12F, respectively. Therefore, the focusing error FE obtained by the optical head as shown in FIG. 10 becomes (FEa−FEb) which is negative in FIGS. 12A and 12D, zero in FIGS. 12B and 12E, and positive in FIGS. 12C and 12F.

Further, the tracking error signal TEa detected by photo-detector 108a for the push pull method equals to (V111a+

V112*a*)–(V113*a*+V114*a*), while the tracking error signal TEb detected by photo-detector 108*b* equals to ((V111*b*+V112*b*)–(V113*b*+V114*b*)). Therefore, the tracking error signal TE detected by the optical head as shown in FIG. 10 becomes (TEa+TEb).

Furthermore, the read out signal RF is calculated on the basis of the outputs from 108*a* and 108*b*.

The read out signal RFa obtained by photo-detector 108*a* is (V111*a*+V112*a*+V113*a*+V114*a*), while the read out signal RFb obtained by photo-detector 108*b* is (V111*b*+V112*b*+V113*b*+V114*b*). Therefore, the readout signal RF obtained by the optical head as shown in FIG. 10 becomes (RFa+RFb). Thus, the FE signal, TE signal, ,and RF signal are obtained by the optical head as shown in FIG. 10. Further, it has been demonstrated that the interference between the FE signal and the TE signal is smaller in the optical head as shown in FIG. 10 than in the optical head as shown in FIG. 7.

Further, the so called land/groove recording for high density optical disk is explained, referring to FIGS. 13A and 13B. In the land recording, light beam 116 is irradiated on to land 117 which is a concave portion as shown in Figure in 13A of a pre-grooved disk. Likewise, in the groove recording, light beam 116 is irradiated on to groove 118 which is a convex portion as shown in FIG. 13B of the pre-grooved disk.

The focusing error signal from the land is equal to that from the groove, only when the axis of cylindrical lens is directed strictly to 45° from the radial direction of the optical disk. However, The angle θ is deviated from 45°, due to errors in the manufacturing and assembling steps of optical light detecting portions and head.

The relations between focusing error signal and defocus distance are shown in FIGS. 14A, 14B, and 14C. Here, the focusing error signal FE is normalized by the readout signal RF. Further, the focusing signal from land (land focusing signal 119) is indicated by solid line, and the groove focusing signal 120 is indicated by dotted line. Further, sensitivity of focusing error signal is defined herein as an absolute value of the inclination of linear plot in the focusing error vs. defocus relation. The focusing error sensitivity is the same for land and groove, as shown in FIG. 14B, when the angle θ is 45°. On the other hand, the sensitivity of the land focusing error 119 (land sensitivity) becomes greater than the groove sensitivity, as shown in FIG. 14A, when the angle θ is greater than 45°. On the contrary, the land sensitivity becomes smaller than the groove sensitivity, as shown in FIG. 14C, when the angle θ is smaller than 45°.

The land focusing error actually has positive off-set at zero defocus, while the groove focusing error actually has negative off-set at zero defocus. However, these off-sets can be compensated completely by electronic circuits, although they are inevitable in principle.

Further, the focusing error signals FEa due to the 50% transmission beam from beam splitter 109 of the optical head as shown in FIG. 10 are shown in FIGS. 15A, 15B,and 15C. The horizontal axis is the defocus distance, and the vertical axis is FEa/RFa. Further, land focusing error 119*a* is indicated by solid line, and groove focusing error 120*a* is indicated by dotted line.

Likewise, the focusing error signals FEb due to the 50% reflection beam from beam splitter 109 of the optical head as shown in FIG. 10 are shown in FIGS. 15D, 15E,and 15F.

As shown in FIGS. 15B and 15E, the focusing error sensitivity is the same for land and groove, when the angle θ is 45°. On the other hand, as shown in FIGS. 15A and 15D, the land sensitivity becomes greater than the groove sensitivity, when the angle θ is greater than 45°. On the contrary, as shown in FIGS. 15C and 15F, the land sensitivity becomes smaller than the groove sensitivity, when the angle θ is smaller than 45°.

The normalized focusing error signal FE/RF is ((FEa/RFa)–(FEb/RFb))/2 for the optical head as shown in FIG. 10. In this optical head, the angle θ is independently deviated from 45°, and the above-defined FE/RF signal for the land recording may possibly be greater or smaller than the FE/RF for the groove recording.

The land focusing error actually has positive off-set at zero defocus, while the groove focusing error has actually negative off-set at zero defocus, in FIGS. 15A, 15B,and 15C. Likewise, the land focusing error actually has negative off-set at zero defocus, while the groove focusing error has actually positive off-set at zero defocus, in FIGS. 15D, 15E, and 15F. However, these off-sets can be compensated completely by electronic circuits, although they are inevitable in principle.

Therefore, the conventional optical heads as shown in FIGS. 7 and 10 has a disadvantage that a gain of focusing servo circuit can not be properly adjusted. Concretely, when the gain is optimized for the lower sensitivity side of the focusing error signal, the focusing servo circuit begins oscillating for the higher sensitivity side. On the other hand, when the gain is optimized for the higher sensitivity side of the focusing error signal, the gain of the focusing servo circuit becomes too small to eliminate the focusing error residue for the lower sensitivity side. Accordingly, the focusing servo becomes instable, during access operations when the optical head traverses the pre-grooved tracks. In short, the conventional optical heads are not suitable for the land/groove recording.

SUMMARY OF THE INVENTION

Therefore, an object of the present invention is to provide an optical head suitable for the land/groove recording, wherein the land focusing error can be made equal to the groove focusing error.

In the present invention, a light beam reflected by a recording medium is diffracted by a holographic element. Then, the ±1st order diffracted light beams are detected by a photo-detector. The holographic element functions as cylindrical lenses for the ±1st order diffracted light beams. The axis of the first cylindrical lens for the +1st order light beam is directed at +45° from the direction normal to the track direction, while the axis of the second cylindrical lens for the –1st order light beam is directed at –45° from the direction normal to the track direction. Further, the second focusing error signal on the basis of the –1st order diffracted light beam is subtracted from the first focusing error signal on the basis of the +1st order diffracted light beam in order to obtain the focusing error signal.

According to the optical head of the present invention, wherein the focusing error signal is generated by the difference between the focusing error signals obtained by the ±1st order diffracted light beams, the focusing error sensitivities for both land and groove are the same, even when the axis of the holographic element is deviated from ±45°, due to errors in the manufacturing and assembling. In other words, the sensitivities of focusing error signal become the same for land and groove, regardless of manufacturing error of optical parts and assembling error of optical head, because the focusing error signal is generated on the basis of the difference between the focusing error signals detected by the ±1st order diffracted beams. Therefore, the focusing servo on land/groove recording system is stabilized, because the servo gains are optimized simultaneously for both land and groove.

BRIEF EXPLANATION OF THE DRAWINGS

FIG. 1 is a conceptual view for explaining optical paths of an optical head of the first mode of embodiment of the present invention.

FIG. 5 is a conceptual view for explaining optical paths of an optical head of the second mode of embodiment of the present invention.

FIG. 7 is a conceptual view for explaining optical paths of a conventional optical head employing a cylindrical lens.

FIG. 8 is a plan view for explaining the relation between axis of the cylindrical lens and the radial or tangential direction of optical disk.

FIGS. 15A, 15B, and 15C are graphs showing relations between defocus distances and focusing errors detected by one of two detecting portions of a photo-detector for land indicated by solid lines and groove indicated by dotted lines, in the conventional optical head as shown in FIG. 10.

FIGS. 15D, 15E, and 15F are graphs showing relations between defocus distances and focusing errors detected by the other detecting portion of a photo-detector for land indicated by solid lines and groove indicated by dotted lines, in the conventional optical head as shown in FIG. 10.

PREFERRED EMBODIMENT OF THE INVENTION

Figure 2:
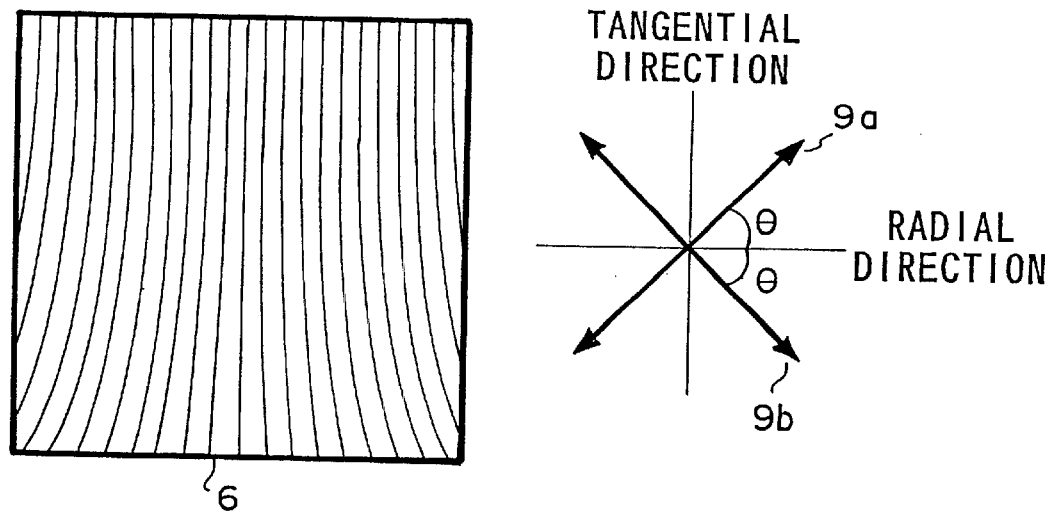
FIG. 2 is an illustration of holographic element of the optical head of the first mode of embodiment.

Preferred modes of embodiment of the present invention are explained, referring to the drawings. The first mode of embodiment is shown in FIG. 1. As shown in FIG. 1, the optical head of the present invention comprises semiconductor laser 1, collimator lens 2, beam splitter 3 for separating the beam from semiconductor laser 1 from the beam reflected by optical disk 5, and objective lens 4 for focusing the laser beam from semiconductor laser 1 upon optical disk 5.

Further, the optical head of the present invention comprises holographic element 6 for diffracting the beam reflected by optical disk 5 and beam splitter 3, convex lens 7, photo-detector 8 for detecting the ±1st order light beams diffracted by holographic element 6. Optical disk 5 rotated by a not-shown motor is a recording media for land/groove recording, wherein the lands and grooves are formed at a prescribed interval.

Focusing servo circuit 30 controls the focusing of the laser beam on the lands and grooves on optical disk 5. The focusing signal generated by focusing servo circuit 30 is a difference between the outputs from the two photo-detectors for detecting the ±1st order diffracted beams. Tracking servo circuit 31 controls the tracking of the laser beam on the lands and grooves on optical disk 5. Actually, focusing servo circuit 30 actuates a not-shown focusing actuator, while the tracking servo circuit 31 actuates a not-shown tracking actuator.

Read-out circuit 32 reads out the information recorded on the lands and grooves, by processing the output from photo-detector 8. Recording circuit 33 records information on the lands and grooves of optical disk 5, by modulating the information and driving semiconductor laser 1 on the basis of the modulated information signal.

The light from semiconductor laser 1 is collimated by collimator lens 2. Then, about 50% of the light passes through beam splitter 3. Further, the light is focused on optical disk 5 by objective lens 4. The reflected light from optical disk 5 passes through objective lens 4. Then, about 50% of the reflected light is reflected by beam splitter 3. Most of the beam reflected by beam splitter 3 is diffracted to become the ±1st order diffracted beams, and the diffracted beams are detected by photo-detector 8. The diffraction efficiency of the ±1st order diffracted beams are about 40%, respectively, when the phase difference between line and space of holographic element 6 is π.

A plan view of holographic element 6 is shown in FIG. 2. There are formed interference fringes of hyperbolic curves of which asymptotic lines are directed at the radial and tangential directions of optical disk 5. The lattice direction as shown in FIG. 2 is almost parallel to the tangential direction of optical disk 5. The holographic element 6 functions as cylindrical lenses for the ±1st order diffracted light beams. The axis 9a of the first cylindrical lens for the +1st order light beam is directed at +θ=+45° from the direction normal to the track direction, while the axis 9b of the second cylindrical lens for the −1st order light beam is directed at −θ=−45° from the direction normal to the track direction. Therefore, the two axes are orthogonal with each other.

Figure 3A:
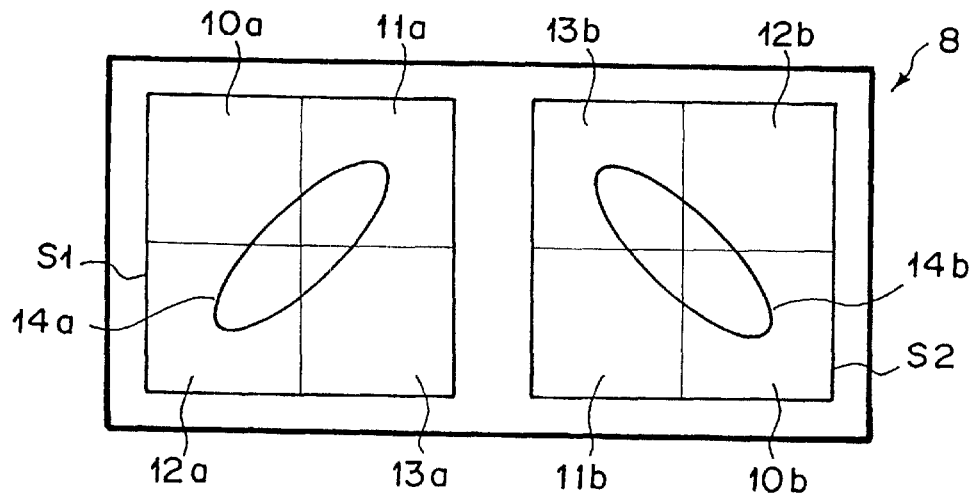
FIG. 3A is a plan view of laser beam spots on a photo-detector, when an optical disk is nearer to an objective lens than a focusing point.
Figure 3B:
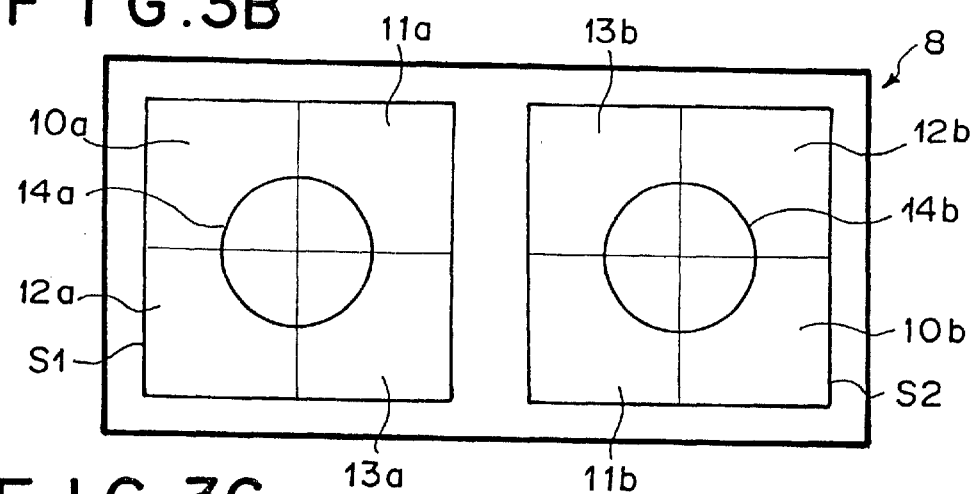
FIG. 3B is a plan view of laser beam spots on a photo-detector, when an optical disk is positioned just on a focusing point.
Figure 3C:
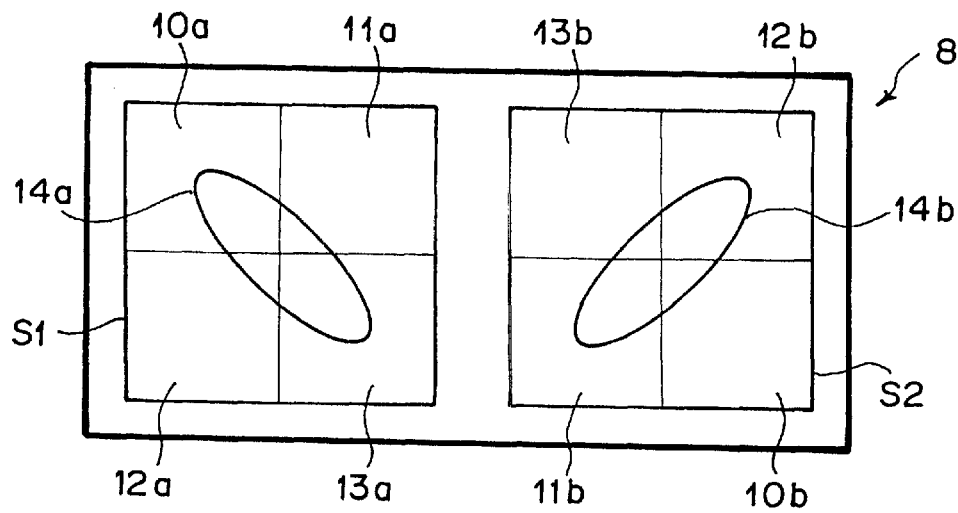
FIG. 3C is a plan view of laser beam spots on a photo-detector, when an optical disk is farther from an objective lens than a focusing point.

Photo-detector 8 and beam spots thereon are shown in FIGS. 3A, 3B and 3C. Photo-detector 8 comprises sub-detectors S1 and S2 positioned along the direction normal to the track direction. Sub-detector S1 comprises four light detecting portions 10a to 13a on which the +1st order diffracted beam becomes beam spot 14a, while sub-detector S2 comprises four light detecting portions 10b to 13b on which the −1st order diffracted beam becomes beam spot 14b. The left to right direction in FIG. 2 is the radial direction of optical disk 5 and the down to up direction in FIG. 2 is the tangential direction of optical disk 105, while the left to right direction in FIGS. 3A, 3B, and 3C is the tangential direction and the down to up direction is the radial direction, because holographic element functions as cylindrical lenses. Beam spot 14a and beam spot 14b are mirror symmetrical in respect to the down to up direction, because axes 9a and 9b are orthogonal with each other.

When optical disk 5 is positioned nearer to objective lens 4 than the focusing point, the major axis of elliptic beam spot 14a is directed from the lower left to the upper right, while the major axis of elliptic beam spot 14b is directed from the upper left to the lower right, as shown in FIG. 3A. When optical disk 5 is positioned just on the focusing point, the beam spots 14a and 14b are circular, as shown in FIG. 3B. Further, when optical disk 5 is positioned farther from the objective lens 4 than the focusing point, the major axis of elliptic beam spot 14a is directed from the upper left to the lower right, while the major axis of elliptic beam spot 14b is directed from the lower left to the upper right, as shown in FIG. 3C.

The outputs from light detecting portions 10a to 13a as shown in FIGS. 3A, 3B, and 3C are V10a to V13a, respectively, while the outputs from light detecting portions 10b to 13b are V10b to V13b, respectively.

The focusing error signal FEa detected by sub-detector S1 equals to $((V10a+V13a)-(V11a+V12a))$, the focusing error signal FEb detected by sub-detector S2 equals to $((V10b+V13b)-(V11b+V12b))$. FEa becomes negative, zero, and positive, in FIGS. 3A, 3B, and 3C, respectively, while FEb becomes positive, zero, and negative, in FIGS. 3A, 3B, and 3C, respectively. Therefore, the focusing error FE obtained by the optical head as shown in FIG. 1 becomes (FEa−FEb) which is negative in FIG. 3A, zero in FIG. 3B, and positive in FIG. 3C.

Further, the tracking error signal TEa detected by sub-detector S1 for the push pull method equals to $((V10a+V11a)-(V12a+V13a))$, while the tracking error signal TEb detected by sub-detector S2 equals to $((V10b+V11b)-(V12b+V13b))$. Therefore, the tracking error signal TE detected by the optical head as shown in FIG. 1 becomes (TEa+TEb).

Furthermore, the read out signal RF is calculated on the basis of the outputs from S1 and S2. The read out signal RFa obtained by sub-detector S1 is $(V10a+V11a+V12a+V13a)$, while the read out signal RFa obtained by sub-detector S2 is $(V10b+V11b+V12b+V13b)$. Therefore, the readout signal RF obtained by the optical head as shown in FIG. 1 becomes (RFa+RFb) which is processed by read out circuit 32.

Figure 4A:
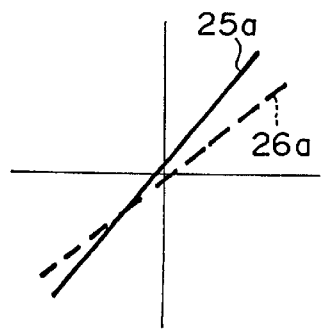
FIGS. 4A, 4B, and 4C are graphs showing relations between defocus distances and focusing errors detected by one of two detecting portions of a photo-detector for land indicated by solid lines and groove indicated by dotted lines.
Figure 4D:
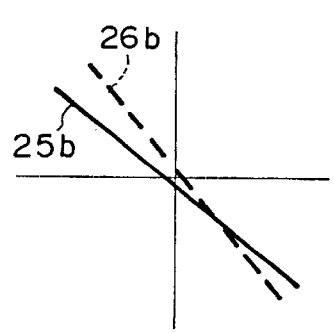
FIGS. 4D, 4E, and 4F are graphs showing relations between defocus distances and focusing errors detected by another detecting portion of a photo-detector for land indicated by solid lines and groove indicated by dotted lines.
Figure 4G:
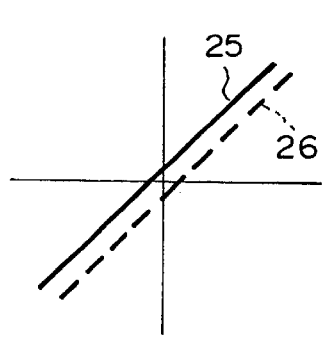
FIGS. 4G, 4H, and 4I are graphs showing relations between defocus distances and focusing errors generated by a focusing servo circuit for land indicated by solid lines and groove indicated by dotted lines.
Figure 4B:
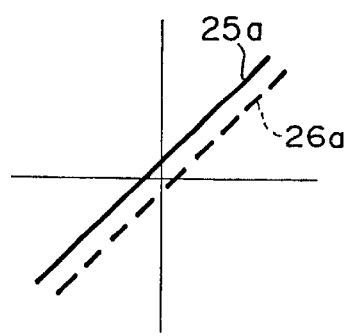
Figure 4E:
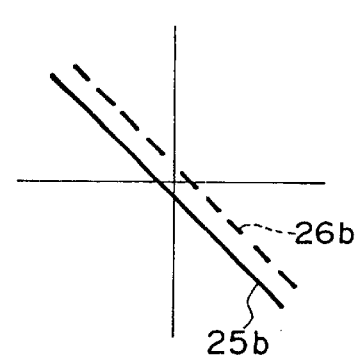
Figure 4H:
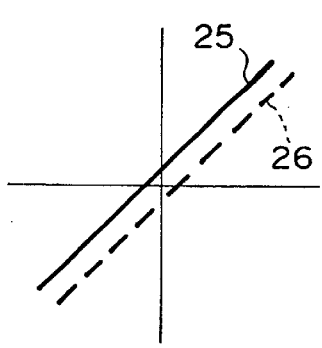
Figure 4C:
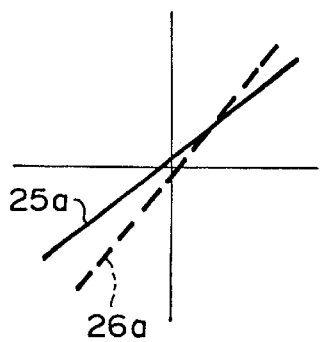
Figure 4F:
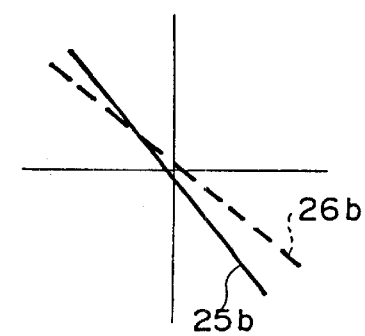

The relations between focusing error signal and defocus distance are shown in FIGS. 4D to 4F. Focusing error signals FEa from +1st order diffracted beam on sub-detector S1 are shown in FIGS. 4A, 4B, and 4C. The horizontal axis is the defocus distance of optical disk 5, while the vertical axis is FEa/RFa. Further, the focusing signal from land (land focusing signal 25a) is indicated by solid line, and the groove focusing signal 26a is indicated by dotted line.

Figure 4I:
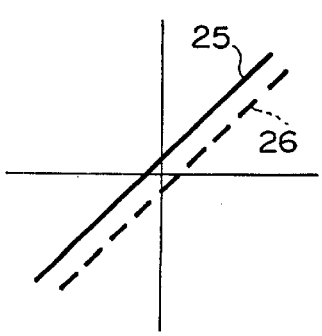

Focusing error signals FEb from the −1st order diffracted beam on sub-detector S2 are shown in FIGS. 4D, 4E, and 4F. The horizontal axis is the defocus distance of optical disk 5, while the vertical axis is FEb/RFb. Further, the focusing signal from land (land focusing signal 25b) is indicated by solid line, and the groove focusing signal 26b is indicated by dotted line. Focusing error signal FE (FEa−FEb) is shown in FIGS. 4G, 4H, and 4I. The horizontal axis is the defocus distance of optical disk 5, while the vertical axis is FE/RF. Here, $$FE/RF=((FEa/RFa)-(FEb/RFb))/2$$

Focusing servo circuit 30 controls the focusing of the optical head on the basis of FE/RF.

The focusing error sensitivity is the same for land and groove, as shown in FIG. 4B, 4E, and 4H, when the axes 9a and 9b are directed at ±45°.

In FIGS. 4A, 4D, and 4G, the absolute value of the angle between the axis 9a and the radial direction of optical disk 5 is greater than 45°, while the absolute value of the angle between the axis 9b and the radial direction of optical disk 5 is smaller than 45°. In this case, the sensitivity of land focusing error 25a is greater than that of groove focusing error 26a as shown in FIG. 4A, while the sensitivity of land focusing error 25b is smaller than that of groove focusing error 26b as shown in FIG. 4D. However, the inclinations of the plotted lines as shown in FIG. 4G are the same for land focusing error 25 and groove focusing error 26, because focusing error FE is generated on the basis of the difference between FEa and FEb. Therefore, the gains of focusing servo circuit 30 for both of the land and groove are optimized.

On the contrary, in FIG. 4C, 4F, and 4I, the absolute value of the angle between the axis 9a and the radial direction of optical disk 5 is smaller than 45°, while the absolute value of the angle between the axis 9b and the radial direction of optical disk 5 is greater than 45°. In this case, the sensitivity of land focusing error 25a is smaller than that of groove focusing error 26a as shown in FIG. 4C, while land sensitivity is greater than groove sensitivity as shown in FIG. 4F. However, the inclinations of the plotted lines as shown in FIG. 4I are the same for land focusing error 25 and groove focusing error 26, because focusing error FE is generated on the basis of the difference between FEa and FEb. Therefore, the gains of focusing servo circuit 30 for both of the land and groove are optimized.

The land focusing error actually has positive off-set at zero defocus, while the groove focusing error actually has negative off-set at zero defocus, as shown in FIGS. 4A, 4B, and 4C. Likewise, the land focusing error actually has negative off-set at zero defocus, while the groove focusing error actually has positive off-set at zero defocus, as shown in FIGS. 4D, 4E, and 4F. Further, FE for land has a positive off-set, while FE for groove has a negative off-set, as shown in FIGS. 4G, 4H, and 4I. However, these off-sets can be compensated completely by electronic circuits, although they are inevitable in principle.

In place of beam splitter 3 as shown in FIG. 1, a polarizing beam splitter may be employed together with a quarter-wave plate between the polarizing beam splitter and objective lens 4. 100% of P-polarization beam from semiconductor laser 1 passes through the polarizing beam splitter. Then, the P-polarization beam is converted to circular polarization beam by the quarter-wave plate. The circular polarization beam reflected by optical disk 5 is converted to S-polarization beam by the quarter-wave plate to be 100% reflected by the polarization beam splitter. Finally, the S-polarization beam is detected by photo-detector 8.

The second mode of embodiment of the present invention is shown in FIG. 5. There are provided semiconductor laser 16, photo-detector 17, and mirror 19 as shown in FIG. 6 in module 15. The beam from semiconductor laser 16 is collimated by collimator lens 2. Then, a part of energy of the beam passes through holographic element 18. Further, the beam is focused on optical disk 5 by objective lens 4. The reflected beam from optical disk 5 passes through objective lens 4. Then, a part of energy of the reflected light is diffracted by holographic element 18 and the ±1st order diffracted beams are detected by photo-detector 17. The transmission rate of holographic element 18 is 50%, and its diffraction efficiency of the ±1st order diffracted beams are about 20%, respectively, when the phase difference between line and space of holographic element 18 is $\pi/2$.

Figure 6A:
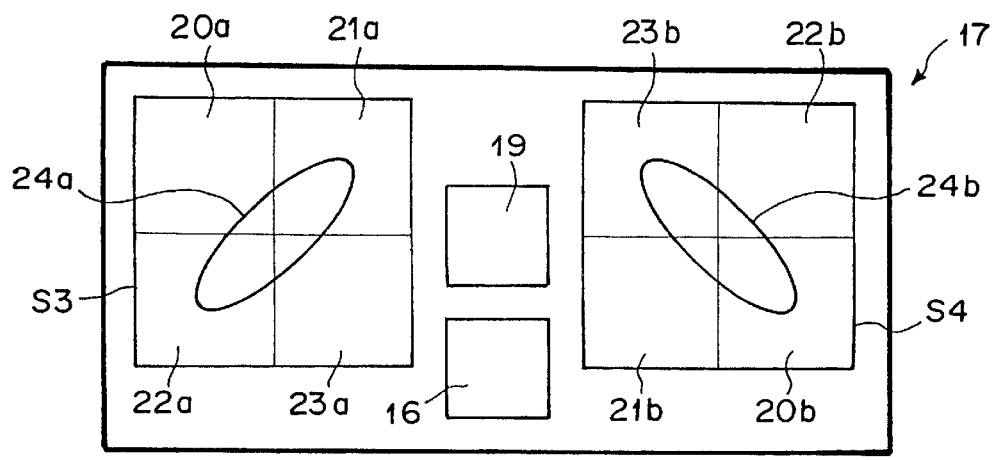
FIG. 6A is a plan view of laser beam spots on a photo-detector, when an optical disk is nearer to an objective lens than a focusing point.
Figure 6B:
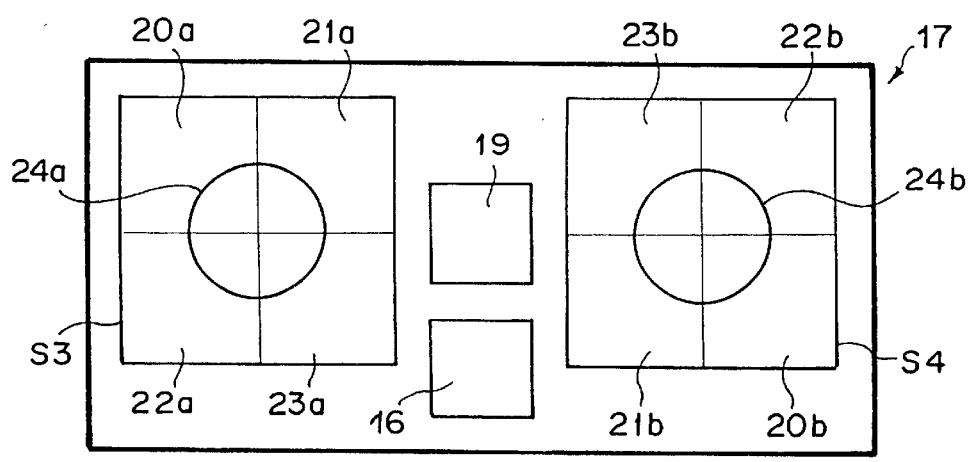
FIG. 6B is a plan view of laser beam spots on a photo-detector, when an optical disk is positioned just on a focusing point.
Figure 6C:
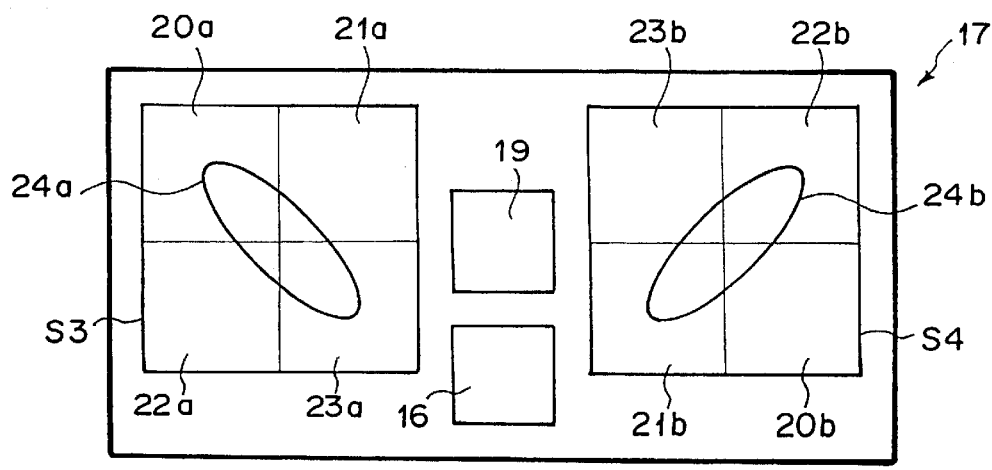
FIG. 6C is a plan view of laser beam spots on a photo-detector, when an optical disk is farther from an objective lens than a focusing point.
Figure 9A:
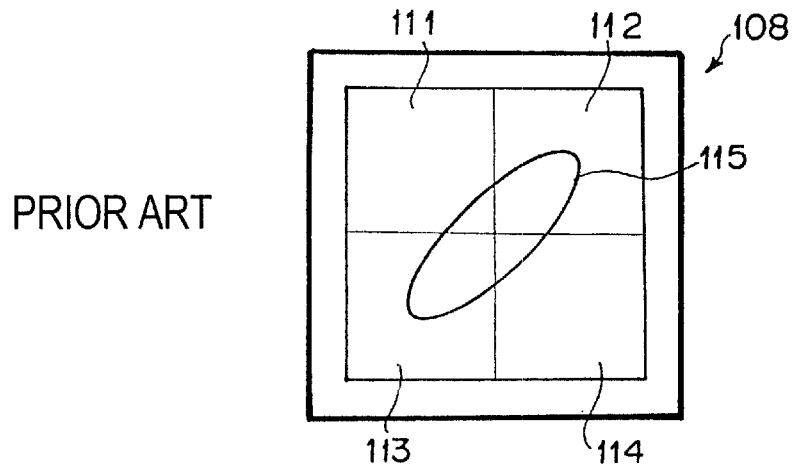
FIG. 9A is a plan view of a laser beam spot on a photo-detector of the conventional optical head as shown in FIG. 7, when an optical disk is nearer to an objective lens than a focusing point.
Figure 9B:
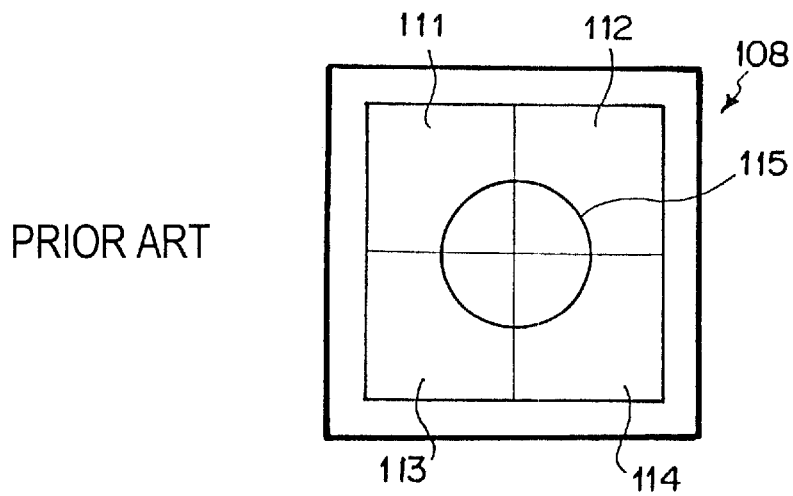
FIG. 9B is a plan view of a laser beam spot on a photo-detector of the conventional optical head as shown in FIG. 7, when an optical disk is positioned just on a focusing point.
Figure 9C:
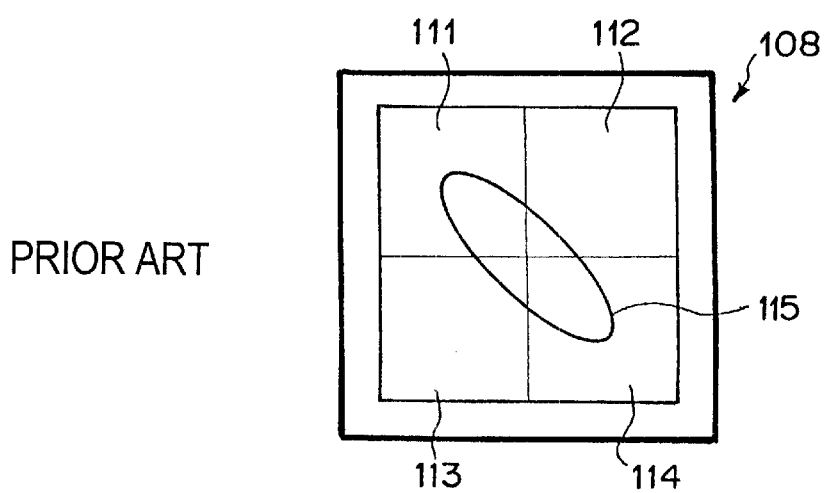
FIG. 9C is a plan view of a laser beam spot on a photo-detector of the conventional optical head as shown in FIG. 7, when an optical disk is farther from an objective lens than a focusing point.
Figure 10:
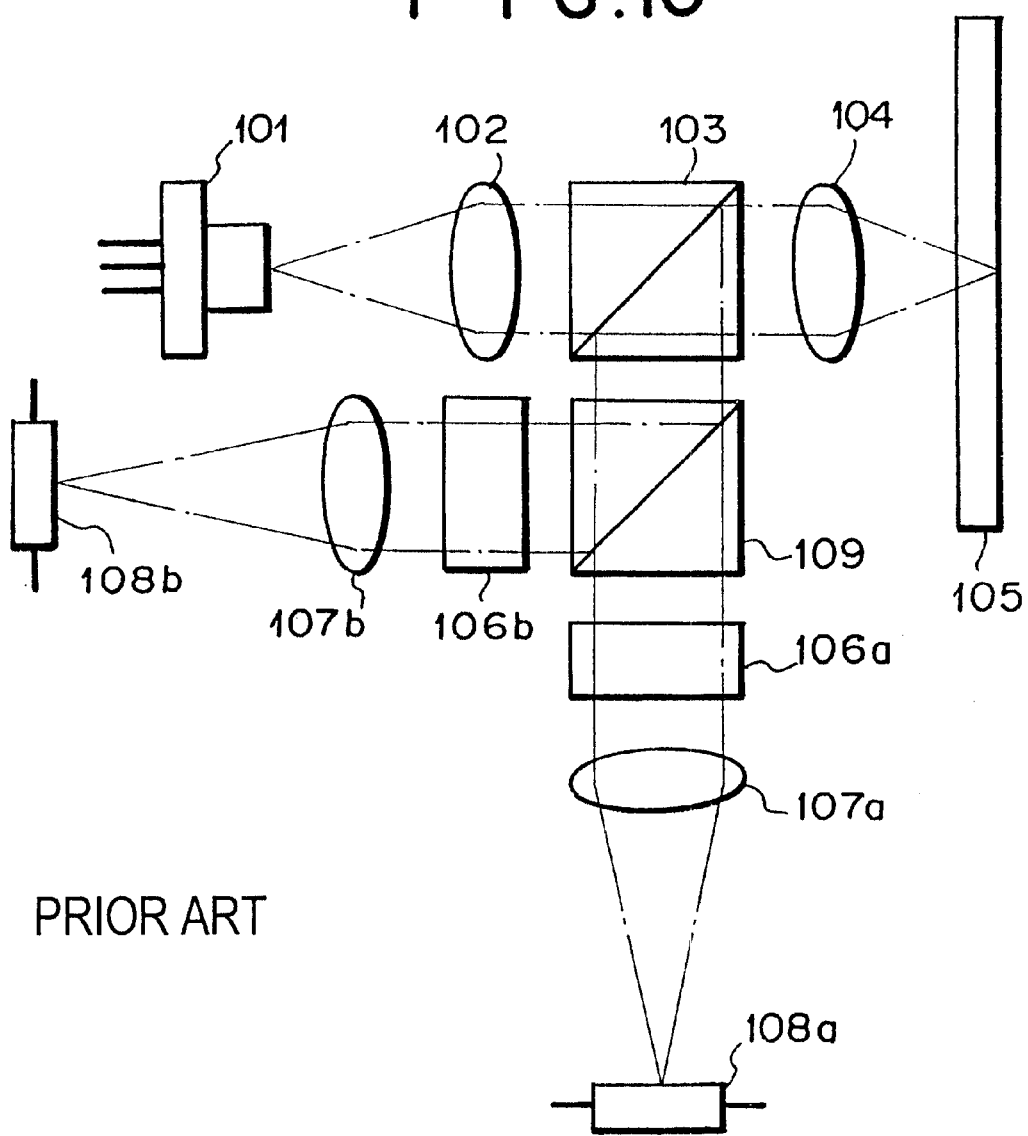
FIG. 10 is a conceptual view for explaining optical paths of another conventional optical head employing two cylindrical lenses.
Figure 11A:
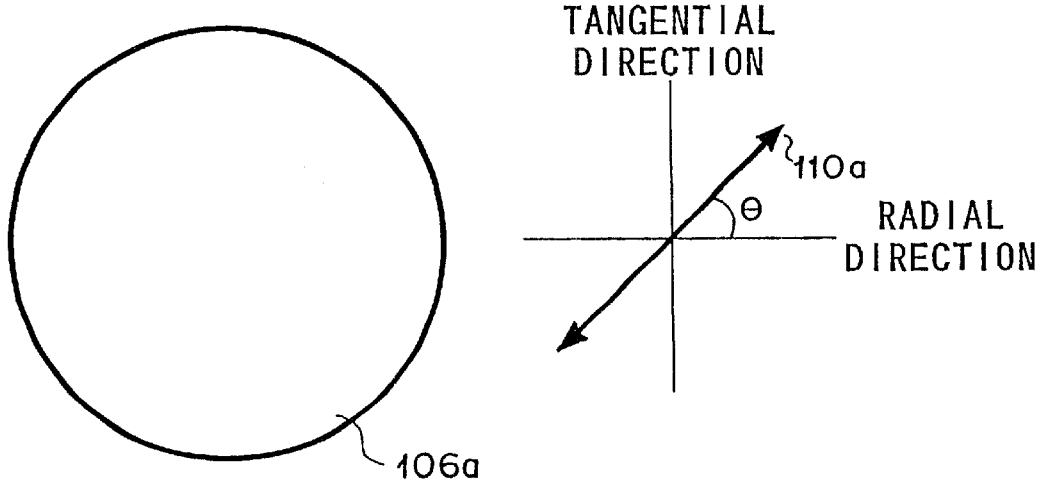
FIG. 11A and 11B are plan views for explaining the relation between axis of the cylindrical lens and the radial or tangential direction of optical disk.
Figure 11B:
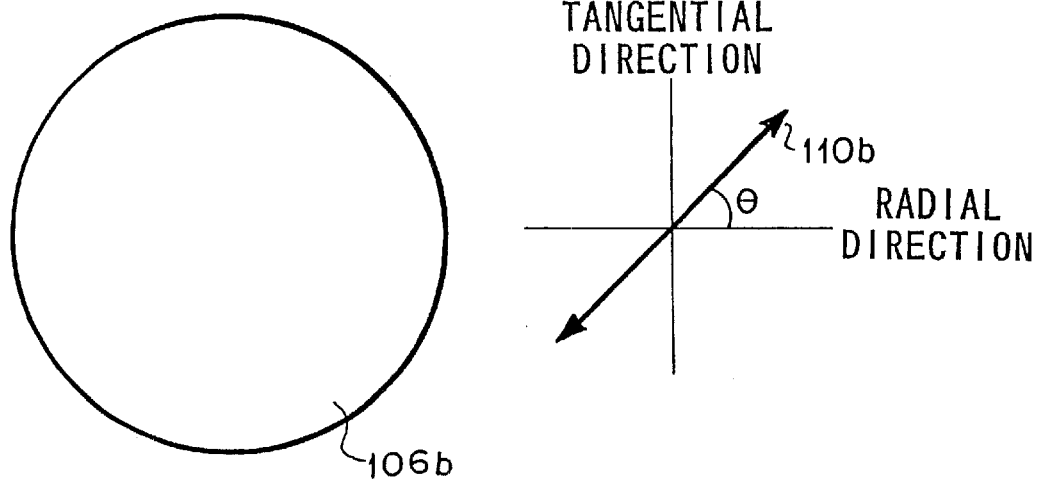
Figure 12A:
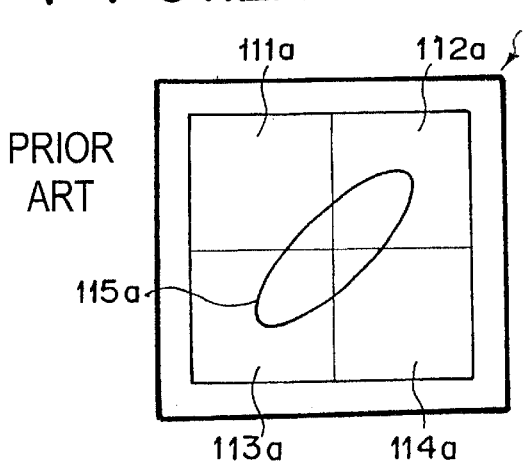
FIG. 12A is a plan view of laser beam spots on a photo-detector 108a of the conventional optical head as shown is FIG. 10, when an optical disk is nearer to an objective lens than a focusing point.
Figure 12D:
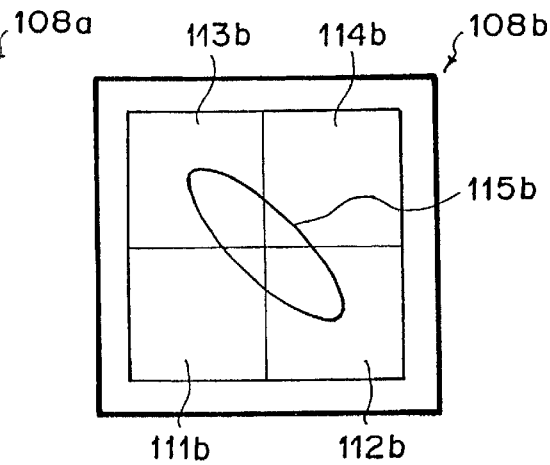
FIG. 12D is a plan view of laser beam spots on photo-detector 108b of the conventional optical head as shown is FIG. 10, when an optical disk is nearer to an objective lens than a focusing point.
Figure 12B:
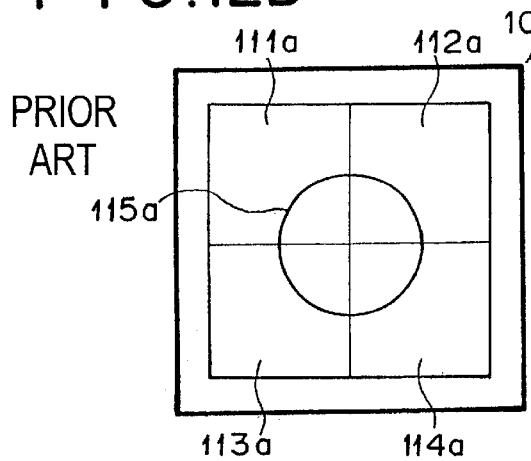
FIG. 12B is a plan view of laser beam spots on a photo-detector 108a of the conventional optical head as shown in FIG. 10, when an optical disk is positioned just on a focusing point.
Figure 12E:
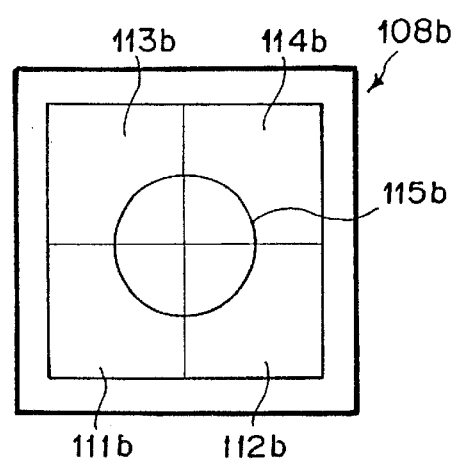
FIG. 12E is a plan view of laser beam spots on photo-detector 108b of the conventional optical head as shown is FIG. 10, when an optical disk is positioned just on a focusing point.
Figure 12C:
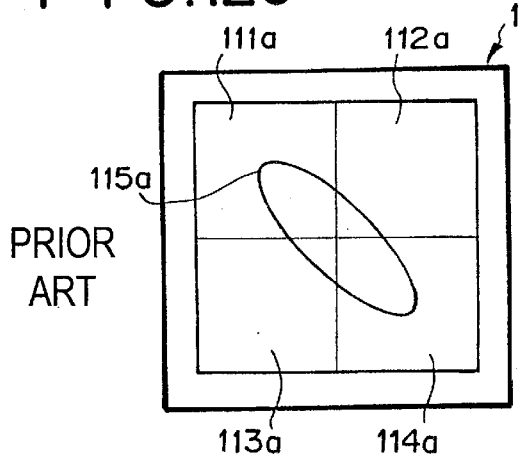
FIG. 12C is a plan view of laser beam spots on photo-detector 108a of the conventional optical head as shown in FIG. 10, when an optical disk is farther from an objective lens than a focusing point.
Figure 12F:
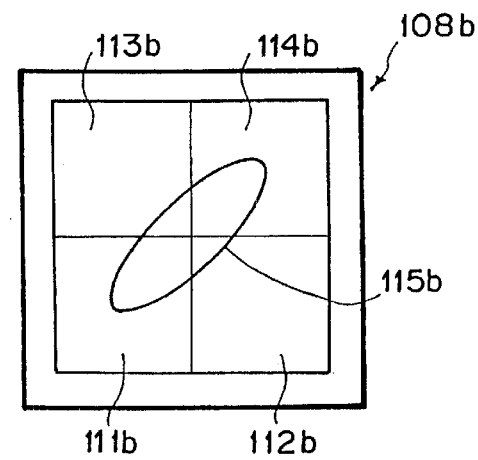
FIG. 12F is a plan view of laser beam spots on photo-detector 108b of the conventional optical head as shown in FIG. 10, when an optical disk is farther from an objective lens than a focusing point.
Figure 13A:
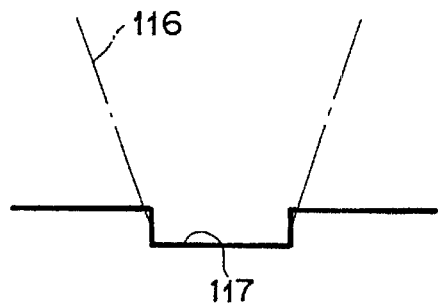
FIGS. 13A and 13B are cross sectional views for explaining the land/groove recording.
Figure 13B:
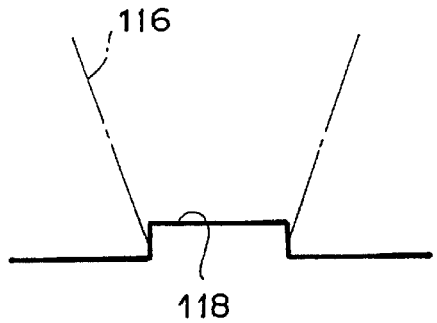
Figure 14A:
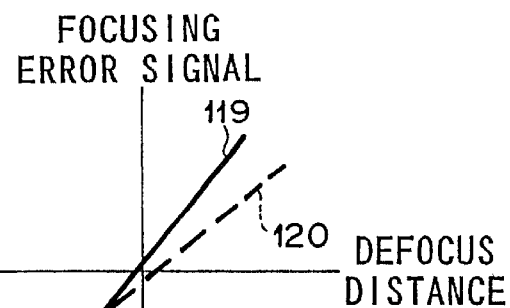
FIG. 14A is a graph showing a relation between focusing error and defocus distance in the conventional optical head as shown in FIG. 7, when an optical disk is nearer to an objective lens than a focusing point.
Figure 14B:
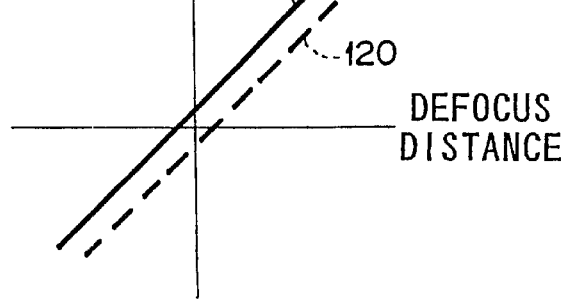
FIG. 14B is a graph showing a relation between focusing error and defocus distance in the conventional optical head as shown in FIG. 7, when an optical disk is positioned just on a focusing point.
Figure 14C:
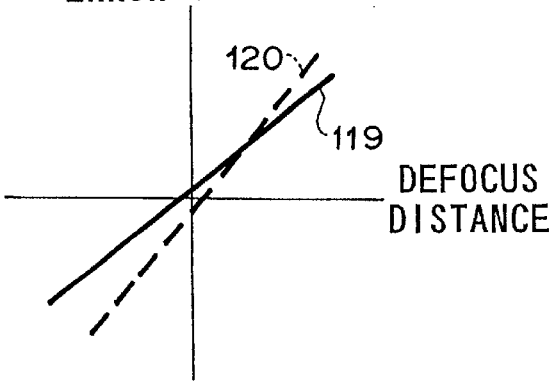
FIG. 14C is a graph showing a relation between focusing error and defocus distance in the conventional optical head as shown in FIG. 7, when an optical disk is farther from an objective lens than a focusing point.

Photo-detector 17 and beam spots thereon are shown in FIGS. 6A, 6B, and 6C. Semiconductor laser 16 and mirror 19 as shown in FIG. 6 are set up on photo-detector 17 which comprises sub-detectors S3 and S4 positioned along the direction normal to the track direction. Sub-detector S3 comprises four light detecting portions 20a to 23a, while sub-detector S4 comprises four light detecting portions 20b to 23b. The beam from semiconductor laser 16 is reflected by mirror 19 as shown is FIG. 6 to be directed toward optical disk 5. Then, the beam reflected by optical disk 5 is diffracted by holographic element 18, and the +1st order diffracted beam becomes beam spot 24a on sub-detector S3.

The −1st order diffracted beam becomes beam spot 24b on sub-detector S4. The left to right direction in FIG. 2 is the radial direction of optical disk 5 and the down to up direction in FIG. 2 is the tangential direction of optical disk 105, while the left to right direction in FIGS. 6A, 6B, and 6C is the tangential direction and the down to up direction is the radial direction, because holographic element 18 functions as cylindrical lenses. Beam spots 24a and 24b are mirror symmetrical in respect to the down to up direction, similarly in FIGS. 3 and 12.

When optical disk 5 is positioned nearer to objective lens 4 than the focusing point, the major axis of elliptic beam spot 24a is directed from the lower left to the upper right, while the major axis of elliptic beam spot 24b is directed from the upper left to the lower right, as shown in FIG. 6A. When optical disk 5 is positioned just on the focusing point, the beam spots 24a and 24b are circular, as shown in FIG. 6B. Further, when optical disk 5 is positioned farther from the objective lens 4 than the focusing point, the major axis of elliptic beam spots 24a is directed from the upper left to the lower right, while the major axis of elliptic beam spots 24b is directed from the lower left to the upper right, as shown in FIG. 6C.

The outputs from light detecting portions 20a to 23a as shown in FIGS. 3A, 3B, and 3C are V20a to V23a, respectively, while the outputs from light detecting portions 20b to 23b are V20b to V23b, respectively.

The focusing error signal FEa detected by sub-detector S3 equals to ((V20a+V23a)−(V21a+V22a)), while the focusing error signal FEb detected by sub-detector S4 equals to ((V20b+V23b)−(V21b+V22b)). FEa becomes negative, zero, and positive, in FIGS. 6A, 6B, and 6C, respectively, while FEb becomes positive, zero, and negative, in FIGS. 6A, 6B, and 6C, respectively. Therefore, the focusing error FE obtained by the optical head as shown in FIG. 5 becomes (FEa−FEb) which is negative in FIG. 6A, zero in FIG. 6B, and positive in FIG. 6C. Further, the tracking error signal TEa detected by sub-detector S3 for the push pull method equals to (V20a+V21a)−(V22a+V23a), while the tracking error signal TEb detected by sub-detector S4 equals to ((V20b+V21b)−(V22b+V23b)). Tracking error signal TE detected by the optical head as shown in FIG. 1 becomes (TEa+TEb).

Furthermore, read out circuit calculates RFa, RFb, and RF, where:

$$RFa = V20a + V21a + V22a + V23a$$

$$RFb = V20b + V21b + V22b + V23b$$

$$RF = RFa + RFb$$

Focusing error signal in the second mode of embodiment is the same as that in the first mode of embodiment, because they are generated on the basis of the difference between the focusing error signals detected by the ±1st order diffracted beams. Therefore, the sensitivities of focusing error signals are the same for land and groove, so that the servo gains are simultaneously optimized for land and groove.

In place of holographic element 18 as shown in FIG. 5, a polarizing holographic element may be employed together with a quarter-wave plate between the polarizing holographic element and objective lens 4. In this case, 100% of ordinary or extraordinary light from semiconductor laser 16 passes through the polarizing holographic element. Then, the ordinary or extraordinary light is converted to circular polarization light by the quarter-wave plate. The circular polarization light reflected by optical disk 5 is converted to the extraordinary or ordinary light by the quarter-wave plate to be diffracted by the polarization holographic element. Finally, the extraordinary or ordinary light is detected by photo-detector 17.

What is claimed is:

1. An optical head for optical information read-write apparatus wherein both land and groove of recording medium are employed for reading and writing by optical beam from said optical head, which comprises:

a holographic element for diffracting reflected light from said recording medium;

a photo-detector having first and second sub-detectors for detecting ±1st order light of said diffracted light;

a first generating means for generating a first focusing error signal on the basis of said +1st order light;

a second generating means for generating a second focusing error signal on the basis of said −1st order light; and a focusing error generating means for generating focus servo signal on the basis of the difference between said first focusing error signal and said second focusing error signal;

wherein said holographic element has interference fringes of hyperbolic curves of which asymptotic lines are directed to the radial and tangential directions of said recording medium, said holographic element functions as a first cylindrical lens for said +1st order light and a second cylindrical lens for said −1st order light, and the angle between the axis of said first cylindrical lens and the direction normal to tracks of said recording medium is +45°, while the angle between the axis of said second cylindrical lens and the direction normal to tracks of said recording medium is −45°.

2. The optical head according to claim 1, wherein said holographic element separates said reflected light from light incident to said recording medium.

3. An optical head, according to claim 1, wherein said first and said second sub-detectors each comprise four light detecting portions.

* * * * *